(12) United States Patent
Raza et al.

(10) Patent No.: US 8,392,943 B2
(45) Date of Patent: Mar. 5, 2013

(54) COMMUNICATIONS BETWEEN NETWORKED CABLE SERVICES SYSTEM DEVICES

(75) Inventors: Muhammad Asif Raza, McDonough, GA (US); Francisco Gonzalez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 537 days.

(21) Appl. No.: 12/698,530

(22) Filed: Feb. 2, 2010

(65) Prior Publication Data

US 2011/0191799 A1 Aug. 4, 2011

(51) Int. Cl.
*H04N 7/10* (2006.01)
*H04N 7/16* (2011.01)
(52) U.S. Cl. ............ 725/34; 725/100; 725/139; 725/151
(58) Field of Classification Search .................... 725/34, 725/100, 131, 139, 140, 151, 152
See application file for complete search history.

(56) References Cited

U.S. PATENT DOCUMENTS

| | | | |
|---|---|---|---|
| 7,430,753 B2 * | 9/2008 | Gray et al. | 725/80 |
| 2009/0031355 A1 * | 1/2009 | Gray et al. | 725/47 |
| 2009/0222874 A1 * | 9/2009 | White et al. | 725/118 |

FOREIGN PATENT DOCUMENTS

WO WO2004056119 A1 7/2004

* cited by examiner

*Primary Examiner* — Kieu Oanh T Bui
(74) *Attorney, Agent, or Firm* — Merchant & Gould

(57) ABSTRACT

Communication methods between networked cable services system devices are provided. Two or more cable services system set-top boxes may be networked together in a house, business or other facility. Alternatively, two or more set-top boxes may be networked together where the two or more set-top boxes are located remotely from each other and are networked via a cable services system. A first set-top box may be designated and equipped as a proxy server for managing communications between networked set-top boxes and one or more other set-top boxes may be designated and equipped as client devices for communicating with other networked set-top boxes via the proxy server set-top box. One or more communication applications may be deployed on each of the networked set-top boxes for allowing user-to-user communications via the networked set-top boxes, as well as, user-to-set-top box communication via the networked set-top boxes. Communications between set-top boxes that may be enabled include, but are not limited to, text communications, voice communications, video communications, set-top box control communications, real time gaming, and the like.

20 Claims, 5 Drawing Sheets

COMMUNICATIONS BETWEEN NETWORKED CABLE SERVICES SYSTEM DEVICES

BACKGROUND OF THE INVENTION

With the advent of digital cable systems, homes, businesses and other facilities often have multiple television sets/systems and associated cable set-top boxes for allowing a variety of content to be distributed to the set-top boxes for presentation on the associated television sets/systems. Some digital communication between networked set-top boxes has been made possible. However, such communication between set-top boxes has been limited, and a need exists to allow user-to-user communication via separate set-top boxes, as well as, user-to-set-top box communication via separate set-top boxes.

It is with respect to these and other considerations that the present invention has been made.

SUMMARY OF THE INVENTION

Embodiments of the present invention are directed to providing a plurality of communication methods between networked cable services system devices. According to an embodiment, two or more cable services system set-top boxes may be networked together in a home, business or other facility. Alternatively, two or more set-top boxes may be networked together where the two or more set-top boxes are located remotely from each other and are networked via a cable services system.

A first set-top box may be designated and equipped as a proxy server for managing communications between networked set-top boxes and one or more other set-top boxes may be designated and equipped as client devices for communicating with other networked set-top boxes via the proxy server set-top box. One or more communication applications may be deployed on each of the networked set-top boxes for allowing user-to-user real-time communications via the networked set-top boxes, as well as, user-to-set-top box real-time communications via the networked set-top boxes. According to embodiments, communications between set-top boxes that may be enabled include, but are not limited to, text communications, voice communications, video communications, set-top box control communications, real-time gaming, and the like.

The details of one or more embodiments are set forth in the accompanying drawings and descriptions set out below. Other features and advantages will be apparent from a reading of the following detailed description and a review of the associated drawings. It is to be understood that the following detailed description is explanatory only and is not restrictive of the invention as claimed.

DETAILED DESCRIPTION

Figure 1:
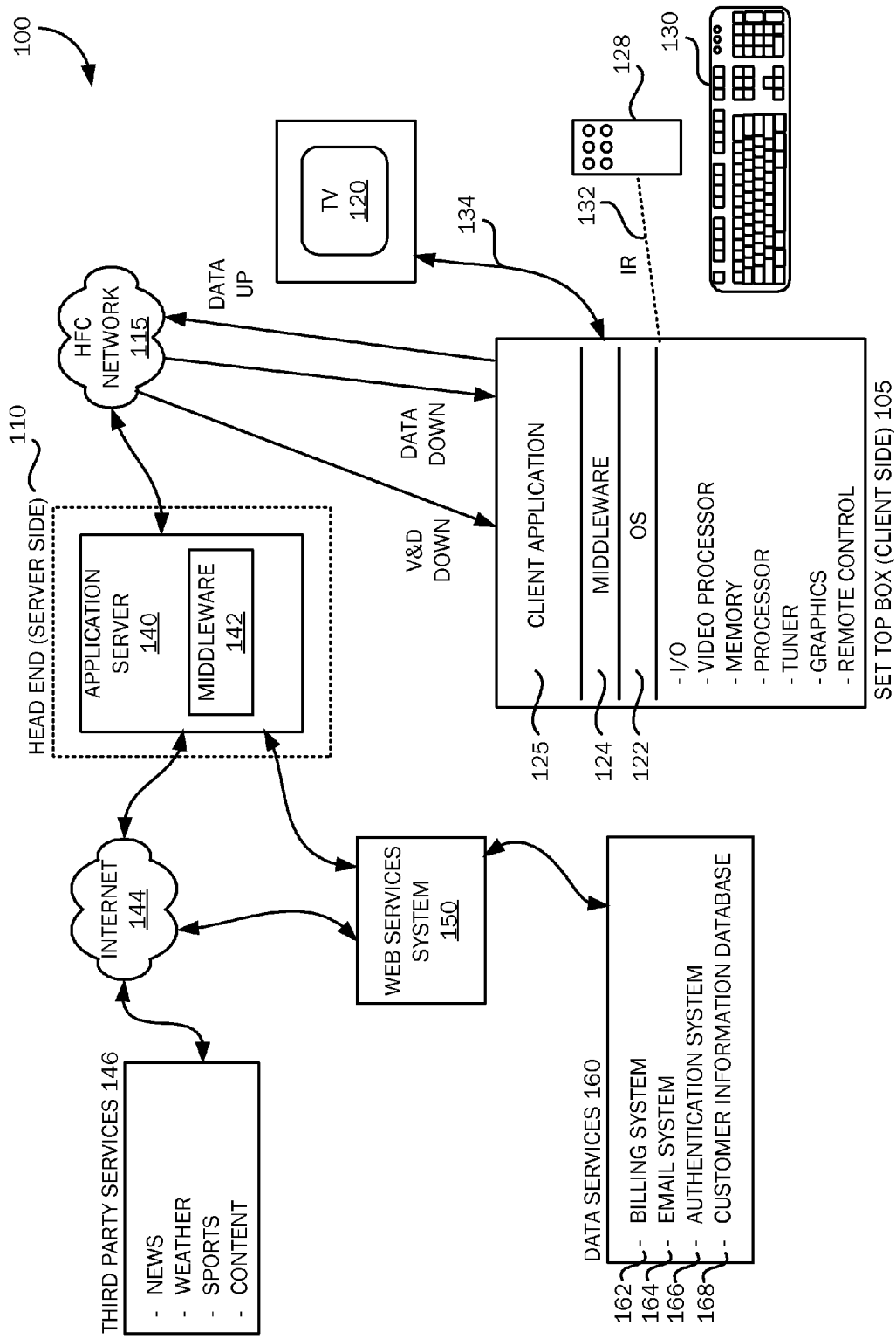
FIG. 1 is a simplified block diagram of a cable services system architecture in which embodiments of the invention may be implemented.
Figure 2:
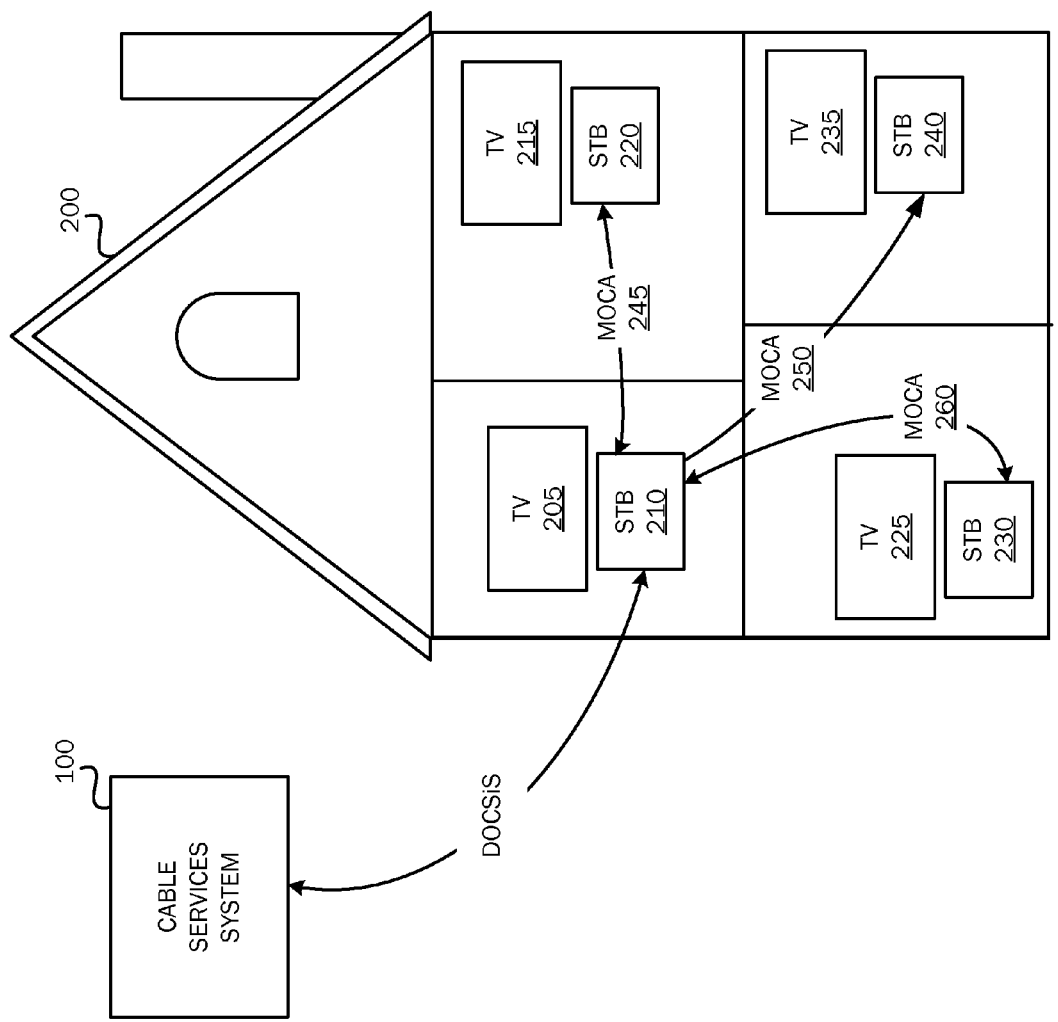
FIG. 2 is a simplified block diagram of a home, business or other facility having a plurality of networked cable services system set-top boxes for allowing a variety of communications between networked set-top boxes.
Figure 3:
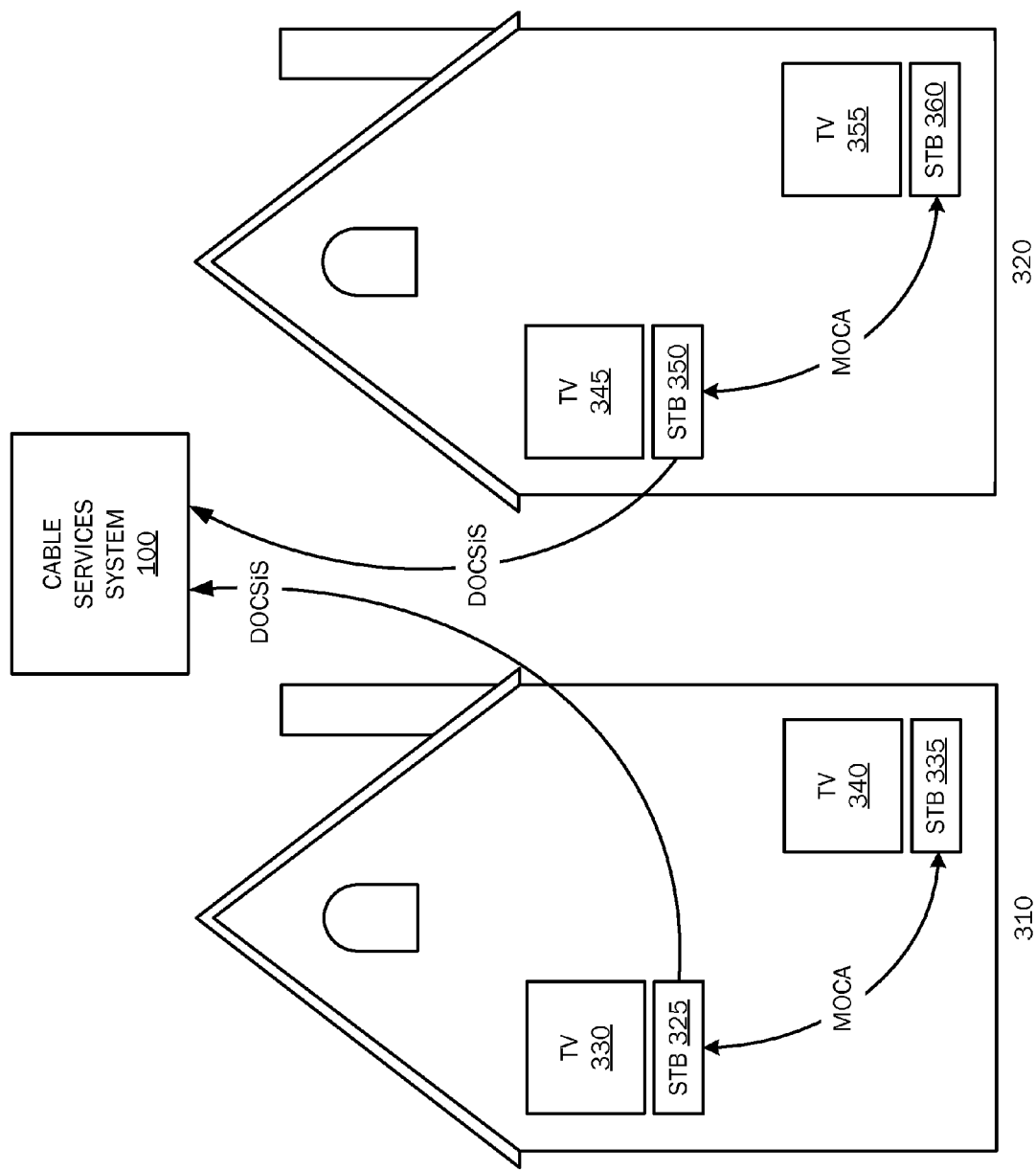
FIG. 3 is a simplified block diagram of two remotely situated facilities having two or more networked cable services system set-top boxes where communications between set-top boxes from each of the remote facilities may be accomplished via a cable services system.

As briefly described above, embodiments of the present invention are directed to providing a plurality of communication methods between networked cable services system devices. According to embodiments, a cable services system as described below with respect to FIGS. 1-3, is leveraged to enable a communication channel among video devices, for example, cable services system set-top boxes (hereinafter set-top box) using a home, business or other facility network. The communication may follow a client-server model and may facilitate real-time text, voice, video communications, as well as, the delivery of control messages between different set-top boxes and associated video devices (e.g. television sets) networked together in a home, business or other facility.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As described herein, cable services system set-top boxes deployed in a home, business or other facility may be networked together to allow a variety of different real-time communications between networked set-top boxes. According to embodiments, networked set-top boxes deployed in a home, business or other facility may be deployed, operated, programmed and may receive content in association with a cable services system. FIG. 1 is a simplified block diagram illustrating a cable services system (hereafter referred to as "CATV") architecture that serves as an exemplary operating environment for embodiments of the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a cable communication transport 134. A multichannel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side according to the Extensible Markup Language (XML). As should be appreciated, XML is only one example of data formatting, and data passed between the client side and the server side may be formatted according to any other suitable formatting language or standard.

According to one embodiment, the set-top box 105 passes digital and analog video and data signaling to the television 120 via a one-way communication transport 134. According to another embodiment, bidirectional communication may be accomplished between the STB 105 and the television 120. For example, high-definition multimedia interface (HDMI) ports on the STB 105 and television 120 allow for bidirectional data communications between the devices. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. The "in band" signaling space may operate at a variety of frequencies. According to one embodiment, the "in band" signaling space may operate at a frequency between 54 and 1000 megahertz. The signaling space is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

According to one embodiment data passed between the CATV system backend components such as the head end 110 and the CATV system front end components such as the STB 105 may be passed according to the Data Over Cable Service Interface Specification (DOCSIS). As is well known to those skilled in the art, DOCSIS provides for a mechanism for data transport over a cable system such as the CATV 100, illustrated in FIG. 1. Among other things, DOCSIS allows for the passing of digital communications and Internet connectivity over an HFC network 115.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105. According to one embodiment of the present invention, data obtained and managed by the middleware layer 142 of the application server 140 is formatted according to the Extensible Markup Language and is passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer profile data from services provider data services 160 for preparing a customer profile that may be utilized by the set-top box 105 for tailoring certain content provided to the customer. According to an embodiment of the present invention, a customer profile may include communications applications provisioned on networked STBs, as well as, designations of individual STBs in a home, business or facility (e.g., "kitchen STB," "bedroom STB," "office STB," and the like).

As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail usage data. An authentication system 166 may include information such as secure user names and passwords utilized by customers for access to network services. The customer information database 168 may include general information about customers such as place of employment, business address, business telephone number and demographic information such as age, gender, educational level, and the like. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

FIG. 2 is a simplified block diagram of a home, business or other facility having a plurality of networked cable services system set-top boxes (STBs) for allowing a variety of communications between networked set-top boxes. Referring now to FIG. 2, a home, business or other facility 200 is illustrated having a plurality of rooms or locations in which is deployed a video device such as a television set or computer monitor and an associated cable services STB for providing content to the associated video from a CATV system 100, as described above with respect to FIG. 1. As should be appreciated, the home, business or other facility 200 may be any suitable facility in which two or more cable services set-top boxes and associated video devices, for example, television sets, may be deployed. For example, the structure 200 may be a home having multiple bedrooms, kitchens, living rooms, bonus rooms and the like. Two or more of the rooms of the example home 200 may have television sets 205, 215, 225, 235 with each television set being functionally connected with a cable services STB 210, 220, 230, 240, respectively. As should be appreciated, and as described above with respect to FIG. 1, each set-top box/television set combination allows for a variety of content to be delivered from the CATV 100 to each of the television set/set-top box combinations. Alternatively, the structure 200 may be a business having multiple offices, conference rooms, work areas, work floors, and the like, wherein each separate room contains a television set/set-top box combination for receiving content from the CATV system 100.

According to embodiments, each of the plurality of set-top boxes deployed in a given facility 200 may be networked together via coaxial cable or other suitable cabling to allow data to be passed from one set-top box to another set-top box. Data may be passed between set-top boxes according to any suitable communications protocol for allowing data to be passed between networked computing devices. According to one embodiment, data may be passed between associated set-top boxes 210, 220, 230, 240 according to the Multimedia Over Cable Alliance (MOCA) technology. As is known to those skilled in the art data may be passed over coaxial cable between CATV STBs in accordance with MoCA® specifications to facilitate in-facility networking between CATV devices (e.g., STBs) on existing coaxial cable in the 1 GHz microwave band, using orthogonal frequency-division multiplexing modulation. According to one embodiment data may be passed between STBs with throughput exceeding 100 Mbit/s.

According to an embodiment, a first set-top box 210 of a set of networked set-top boxes 210, 220, 230, 240, illustrated in FIG. 2, may be designated and equipped as a primary or proxy server for managing communications between networked set-top boxes. Each of the other set-top boxes 220, 230, 240 in the set of networked set-top boxes may be designated and equipped as client devices in the set of networked set-top boxes. As should be appreciated the primary or proxy server STB 210 may also be equipped to serve as a client device for communications with other STBs as described herein. Thus, as will be described below, for a given communications type, the main or proxy server set-top box 210 may be loaded with a software application operative to manage communications between associated client set-top boxes 220, 230, 240. For example, as will be described below, a real time text chatting application may be deployed onto the networked set-top boxes for allowing users of each of the individual set-top boxes to chat with each other via the networked devices. According to this example communications type, the main or proxy server set-top box 210 may be programmed with a software application operative to manage communications between other networked set-top boxes. For example, a chat session between a user of set-top box 230 and set-top box 240 may be accomplished via client side text chatting applications loaded onto the set-top boxes 230, 240 via a text chatting proxy application loaded onto the main or proxy server set-top box 210. The operation of server/client computing relationships for managing communications between client computing devices is well known.

According to an embodiment, operation of the networked communications described herein may be deployed via subscription through the cable services system 100 described above. For example, if the owner, manager or operator of the facility 200 desires that a text chatting application be enabled on the plurality of set-top boxes 210, 220, 230, 240 to allow text chatting communications between the set-top boxes, the owner, manager or operator of the facility may contact the cable services provider and request deployment of the desired application. According to one embodiment, the owner, manager or operator of the facility may utilize a web services system 150 for requesting deployment of the desired application. Alternatively, subscription to the desired application may be requested through one of the set-top boxes 210, 220, 230, 240 via a set-top box-based subscription service.

According to an embodiment, the cable services provider may download the proxy server application for the desired communications application to a first or primary set-top box 210 and client-side applications to the client set-top boxes 220, 230, 240. As part of the ordering or subscription service, each of the networked set-top boxes may be identified to allow efficient communication between networked set-top boxes. Alternatively, after the appropriate communications software is deployed to the plurality of set-top boxes, as described herein, a user of the networked set-top boxes may customize the network for adding identifications of individual set-top boxes, communications security properties, and the like. For example, the set-top box 210 may be designated as the "master bedroom" set-top box, the set-top box 220 may be designated as the "kitchen" set-top box, the set-top box 230 may be designated as the "living room" set-top box and the set-top box 240 may be designated as the "kid's room" set-top box and the like.

In addition, communications security properties may likewise be applied to one or more of the set-top boxes contained in the networked system. For example, an owner of the home 200 may designate that the set-top box 240 may not send or receive communications from other networked set-top boxes after 10:00 p.m. to prevent children using the set-top box 240 from communicating after a time designated by a parent or other guardian. As should be appreciated, these are merely examples of the vast variety of designations and properties that may be applied to individual set-top boxes in the set of networked set-top boxes. According to an embodiment, the identification designations and properties applied to each set-top box in the networked system may be stored as part of a customer profile, described above with respect to FIG. 1.

FIG. 3 is a simplified block diagram of two remotely situated facilities having two or more networked cable services system set-top boxes where communications between set-top boxes from each of the remote facilities may be accomplished via a cable services system. Referring to FIG. 3, a first facility 310 includes two or more networked set-top box/television combinations and a second facility 320 includes two or more networked set-top box/television combinations. As should be appreciated, communications between the networked set-top boxes in each of the facilities 310, 320 may be accomplished, as described above with respect to FIG. 2.

According to an alternative embodiment, communications between set-top boxes from one facility 310 and set-top boxes in a second facility 320 may be accomplished via the cable services system 100, described above with respect to FIG. 1. According to this embodiment, when a communication is directed from a set-top box in one facility 310 to a set-top box in a remote facility 320, a communication from the first set-top box may be accomplished via the in-facility network in the first facility 310 to the in-facility network in the second facility 320 through the cable services system 100. For example, a communication from a set-top box 335 deployed in the first facility 310 to a set-top box 360 deployed in the second facility 320 may, as described above, first to a proxy server set-top box 325 then through the DOCSIS system out of the facility 310 to the cable services system 100. The communication may then be passed from the cable services system 100 via the DOCSIS system to a receiving proxy server 350 deployed in the second facility 320. The communication may then be completed from the proxy server 350 deployed in the second facility 320 to the receiving client-side set-top box 360 deployed in the second facility 320. Thus, networked communications occurring within a facility 310 may be extended out to other networked facilities 320 via the cable services system 100, described above with respect to FIG. 1. According to an alternative embodiment, the sending proxy server 325 and the receiving proxy server 350 may be replaced with a proxy server positioned at the cable services system head end 110 to facilitate communications between the two facilities 310, 320.

Example Communications Sessions Types

As described above, embodiments of the present invention allow for various types of communications sessions to be enabled between networked set-top boxes in a given facility 200 or between two or more facilities 310, 320 via a CATV system 100. Below are examples of communications that may be enabled between networked set-top boxes. As should be understood, the following communications types are not exhaustive of the communications that may be utilized.

Text Chatting: According to this communications type, a user may initiate a real-time text chatting session with another user via networked STBs. A text chatting application may be loaded onto each STB. For the primary or proxy server STB, a text chatting application and a proxy or communications management application will also be loaded to managing chatting sessions between STBs. That is, the STB 210 that serves as the home network server will be configured as a chat server and all the client devices (STBs 220, 230, 240) connected to it will be configured as chat clients. The proxy server STB will perform the duty of communication monitoring and routing, and forwarding messages to the appropriate clients. As discussed above, this communication type leverages the operating system of the CATV devices (STBs) in the home or facility network to implement the chat system, utilizing the resources (e.g., MoCA®, TCP/IP, DLNA, OCAP, etc.) already running on the STBs. The use of the browser traditionally used by chat clients may be replaced by a light weight OCAP/JAVA application. Users of this text chat functionality may use an IR keyboard 130 or IR remote control unit 128 to enter text during chat sessions. Chat functionality may be launched in the STB by the use of special key sequences (e.g., *11) and may be disabled in a similar manner. Using this communication method, users may share real-time comments with the other users on the network, for example, two users watching the same sports event on different devices on the network may comment about the event.

Voice communication: The same communication channel utilized for text chatting may be used to send pre-recorded and real-time voice communications to other users in the network. According to this embodiment, a microphone may be built into or attached to the remote control unit 128 or keyboard 130 or other suitable device for communicating with the STB. Voice communications may be recorded and later sent or sent in real-time to a networked STB via any suitable transport means such as infrared or Bluetooth link. This communication method may allow users to engage in real-time voice communications via networked STBs, wherein the networked STBs form an intercom for the associated home, business or facility.

Video communication: According to another embodiment, each video cameras or web cameras may be functionally attached to each STB to allow the networked STBs to serve as a videoconferencing system over which video communications may be passed. An example use case for video communication includes child or baby monitoring via networked set-top boxes, wherein a parent or guardian may watch or monitor a child or baby via a camera functionally associated with a STB in the room of the child or baby. According to this embodiment, each STB may be loaded with software and may be functionally associated with a camera for capturing and sending video. The proxy server STB may be programmed for facilitating video sessions between networked devices (STBs).

Control messages: According to another embodiment, control messages may be sent from one networked STB to set use permissions and security properties on another networked STB. That is, the same chat application and communication channel, described above, may be leveraged to send control messages to the client devices on the network. Some examples include setting parental controls, real-time denial of access to certain content etc.

Real-time gaming: According to yet another embodiment, real-time gaming may be performed between networked set-top boxes. Each networked STB may be loaded with a desired video game, and the STBs may be associated (wireless or wired) with one or more gaming controls (e.g., handsets, headsets, etc.). Using the proxy server STB as a control device between networked STBs, users of different STBs may play interactive real-time games via data passed between networked devices. According to one embodiment, a gaming application may be run by the proxy server STB, and participating players may log into the gaming application via their individual STBs.

Figure 4:
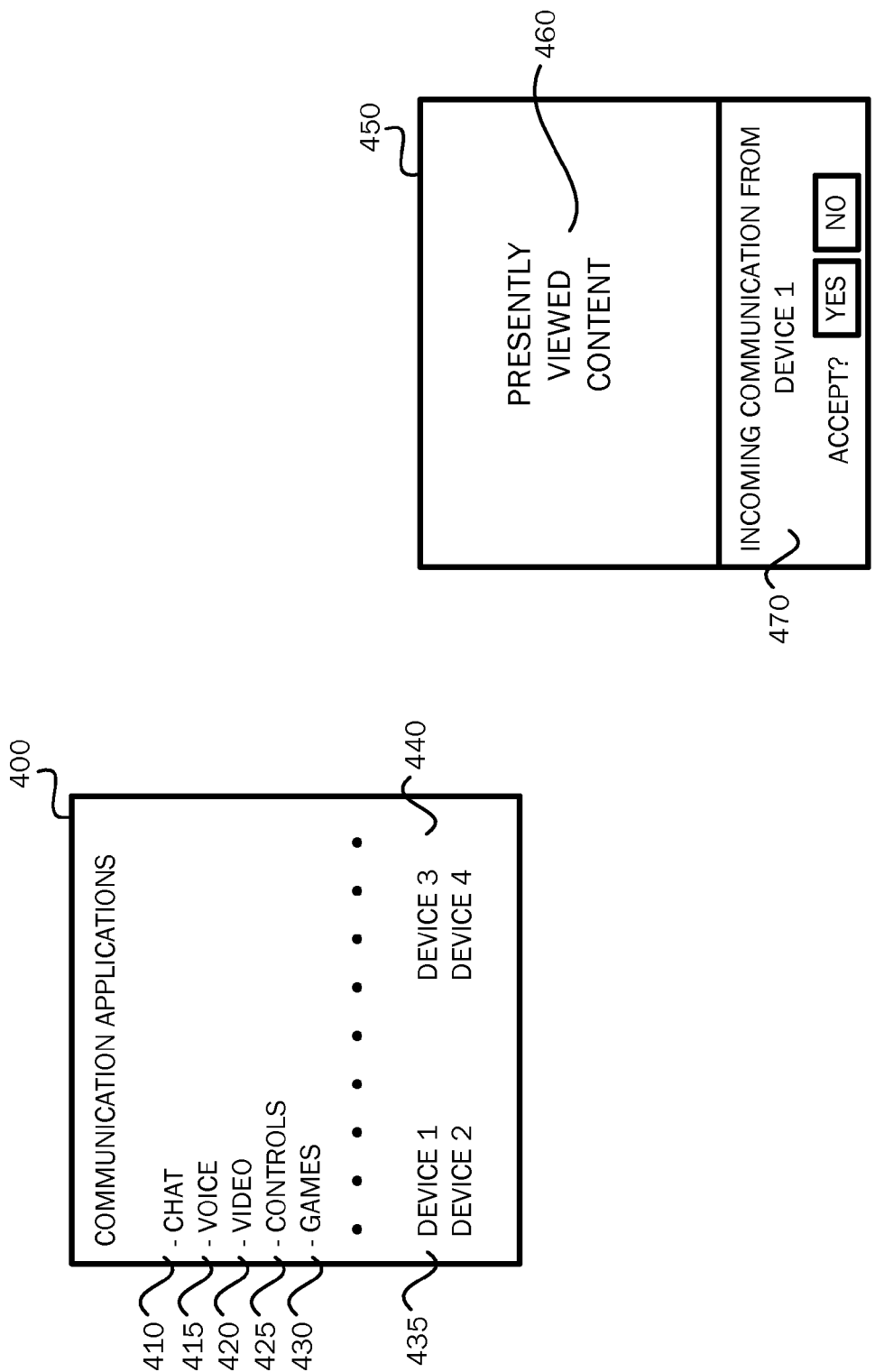
FIG. 4 is a simplified block diagram of example user interfaces for facilitating communications between networked set-top boxes.

FIG. 4 is a simplified block diagram of example user interfaces for facilitating communications between networked set-top boxes. According to an embodiment, when a user of one of the networked set-top boxes 210, 220, 230, 240 wishes to initiate a communications session, as described above, with a user of another set-top box, or if the user wishes to initiate a communications control session directed to another set-top box, a user may activate the desired application via a control device such as the remote control unit 128 or the keyboard 130, described above with respect to FIG. 1. For example, an application activation code such as "A11" or *12" or the like may be entered via the remote control unit 128, the keyboard unit 130, or any other suitable means for allowing communications between a user and the associated set-top box.

Upon receiving the designated code for launching a communications application, the receiving set-top box may launch a user interface 400, as illustrated in FIG. 4, for providing the user with one or more application selections and with one or more devices for directing the desired communications session. As should be appreciated, the user interfaces illustrated in FIG. 4 and the content illustrated in the user interfaces illustrated in FIG. 4 is for purposes of example only and is not limiting of the vast numbers of different types of applications and content that may be displayed in the user interfaces according to embodiments of the present invention.

Referring still to FIG. 4, upon initiation of a communications session, the user interface 400 may be displayed on the television set 205, 215, 225, 235 via the associated set-top box. Referring to the user interface 400, a listing of available communications applications, for example, text chat application 410, voice chat application 415, video chat application 420, controls application 425, games applications 430, and the like, may be displayed in the user interface 400 to allow a requesting user to select one of the available communications applications for use in a desired communications session. In addition, a device with which the requesting user wishes to communicate may be selected from the user interface 400. For example, a user may wish to initiate a text chat from a set-top box 230 to a user currently watching television via set-top box 220. Accordingly, after the user causes a launch of the user interface 400, as described above, the user may select the desired application and a desired receiving set-top box 435, 440 that is presently in use by the person with whom the requesting user would like to communicate.

After the requesting user selects the desired communications application and the desired receiving set-top box, the communications request is passed from the sending set-top box 230 to the proxy server set-top box 210. The proxy server set-top box 210 in turn establishes a communications link between the requesting set-top box 230 and a desired receiving set-top box 220, 240. Referring still to FIG. 4, at the receiving set-top box 220, 240, a user interface 450 may be presented to the receiving user and may be displayed on the receiving user's television set 215, 235. For example, the presently viewed content 460, for example, a television program, may be partially overlaid with an incoming communications alert area 470 to notify the receiving user that an incoming communication is being received from the sending set-top box. For example, a text display such as "text chat incoming from kitchen television" may be displayed in the alert area 470. An acceptance control may be displayed in the alert area 470 for allowing the receiving user to accept or decline the incoming communications invitation. If the receiving user accepts the incoming communication invitation, a communications session may be established by the proxy server set-top box 210 between the sending set-top box 230 and the receiving set-top box 220, 240 via the in-facility network, as described herein. As should be appreciated, the entirety of the display space of the sending and receiving television sets may be utilized for the ensuing communications session, or a small portion of the display space may be utilized for the communications session allowing each user to simultaneously engage in the communications session and continue viewing the presently viewed content 460.

According to one embodiment, each set-top box in the set of networked set-top boxes may be programmed with sufficient computer executable instructions, and may include sufficient memory storage for providing the user interface content illustrated in FIG. 4 and described above. Alternatively, when a communication session is initiated from a client set-top box, a request for the communication session choices illustrated in the user interface 400 may be passed to the proxy server set-top box 210 which may return the communication applications choices and available set-top boxes to the requesting client set-top box for display to the requesting user, as described in the user interface 400.

Figure 5:
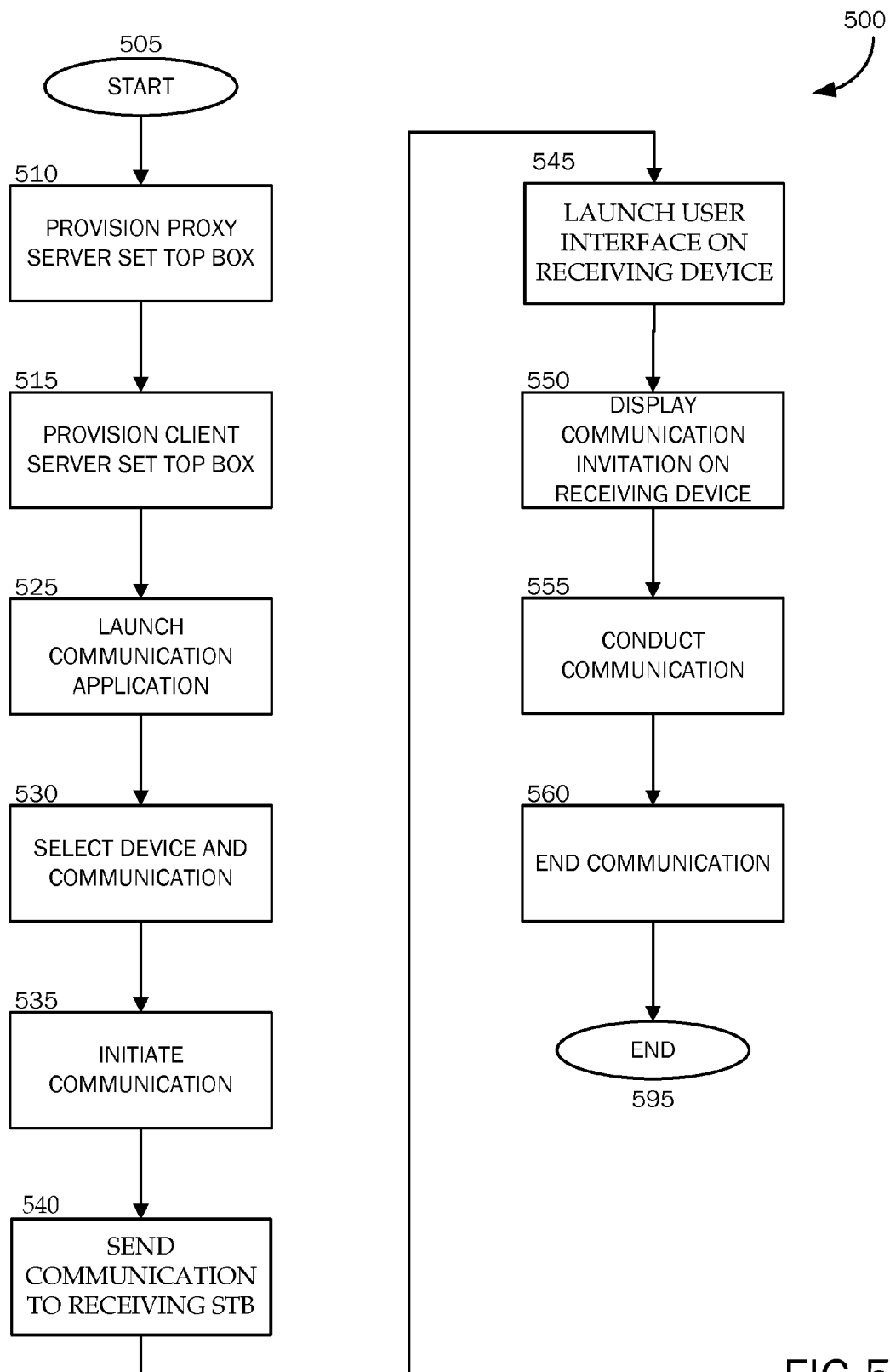
FIG. 5 illustrates an example process flow of communications between networked set-top boxes.

Having described an exemplary operating environment in which embodiments of the present invention may be implemented; FIG. 5 illustrates an example process flow of communications between networked set-top boxes. The routine 500 begins at start block 505 and proceeds to block 510 where a set-top box 210 in a home, business or other facility is provisioned as a proxy server for managing in-facility communications between networked set-top boxes, as described herein. As mentioned above, the set-top box 210 may be provisioned with one or more software applications for managing a variety of different communications types between set-top boxes in the network of set-top boxes. The provisioning of required functionality to the proxy server may be performed remotely from the cable services system 100, or the set-top box 210 may be provisioned with appropriate functionality during an onsite maintenance visit from personnel of the cable services system to which the set-top box 210 is associated. At operation 515, the set-top boxes 220, 230, 240 which will be functionally associated with the proxy server set-top box 210 are provisioned with client side communications applications for enabling communications between the networked set-top boxes, as described herein.

At operation 525, if a user desires to initiate a communications session with another user of one of the other networked set-top boxes, the initiating user may launch a communication application at the initiating user's set-top box/television combination. For example, the initiating user may wish to commence a text chat session with another user of a different set-top box/television combination. For example, the initiating user may be presently viewing a very interesting television show or sporting event, and the present user would like to engage in a text chat session with another user in a different room in the home. That is, the initiating user may wish to comment on various aspects of the television programming being viewed by the initiating user. Or, both users may be watching the same program, for example, an exciting sporting event, and the users would like to chat about the action taking place in the sporting event as it is occurring.

At operation 525, the initiating user utilizes his/her remote control unit 128, keyboard 130, or any other suitable device for interacting with the initiating set-top box to initiate a communication session. For example, the user may type into the remote control unit or keyboard a pre-designated code for launching a communications application such as "*11." After the user enters the appropriate code for launching a communication application session, a user interface such as the user interface 400, illustrated in FIG. 4, may be displayed on the user's television display screen to provide the user with a listing of available communication applications and with a listing of other set-top boxes to which the user may send communications or with which the user may initiate a communications session.

At operation 530, the initiating user may select a desired communication application, for example, a text chat application 410. After the user selects a desired communication application, the user may then select a receiving device 435, 440 for designating the set-top box that will receive the user's communication or with which the user will engage in a communications session. For example, the initiating user may be utilizing a set-top box located in the user's bedroom in the user's home. The initiating user may select a set-top box located in the kitchen of the user's home where the user knows that the receiving user is presently watching television. As described above with reference to FIG. 3, the initiating user may also select a receiving set-top box located in a home, business or facility remote from the initiating user's home, business or facility for initiating and conducting a communications session with a user located at a remote location through the cable services system 100.

At operation 535, in response to a selection of a desired communication application and a receiving set-top box, a message is passed from the initiating set-top box, for example, set-top box 230 to the proxy server set-top box 210. At operation 540, the proxy server set-top box 210 in turn sends the message from the initiating set-top box 230 to the receiving set-top box, for example, set-top box 220. As should be appreciated, a user of the proxy server set-top box may initiate a communications session from the set-top box which would serve as both the proxy server set-top box and a client side set-top box.

At operation 545, an incoming communications user interface may be launched at the receiving set-top box 240 and may be displayed on the receiving user's television display screen 450, as illustrated in FIG. 4. At operation 550, a communication session invitation may be displayed in the alert area 470. For example, an incoming message alert or invitation may be displayed in a portion of the receiving user's television display screen to alert the user that an incoming communication invitation has been received from the initiating user and for allowing the receiving user to accept or decline the communications session.

At operation 555, if the receiving user accepts the communication, then the communication between the initiating user and the receiving user may commence and last as long as the two parties wish to communicate. As described above, the communications session between the users may include a variety of real-time communications types such as text chatting, voice chatting, video conferencing, gaming between the two users, and the like. In addition, as described above, a communication between the initiating user and the receiving set-top box may also include a one-way communication wherein the initiating user manages the receiving set-top box by passing controls, such as parental viewing controls, to the receiving set-top box. At operation 560, the communications session between the initiating user and the receiving set-top box (and receiving user if applicable) ends. The routine 500 ends at operation 595.

As described herein, communications between networked cable services system devices are provided. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method of communication between networked cable services devices, comprising:
    connecting a first set-top box to a second set-top box for allowing data to pass between the first and second set-top boxes;
    establishing a digital communications protocol between the first and second set-top boxes for allowing digital communications to pass between the first and second set-top boxes;

at the first set-top box, initiating a communication session between the first and second set-top boxes;
providing one or more communication applications that may be executed for initiating the communication session between the first and second set-top boxes;
receiving a selection of a communication application for initiating the communication session between the first and second set-top boxes;
sending a communication session invitation from the first set-top box to the second set-top box; and
at the second set-top box, allowing the communication session between the first and second set-top boxes.

2. The method of claim 1, wherein establishing the digital communications protocol between the first and second set-top boxes includes establishing a digital communications link between the first and second set-top boxes according to Multimedia Over Cable Alliance protocol.

3. The method of claim 1, wherein initiating the communication session includes launching a communication application user interface on a display monitor associated with the first set-top box.

4. The method of claim 3, further comprising providing in the communication application user interface a listing of one or more communication applications that may be executed for initiating the communication session with the second set-top box.

5. The method of claim 4, further comprising providing in the communication application user interface a listing of one or more receiving set-top boxes that are connected with the first set-top box, wherein each of the one or more receiving set-top boxes is operative to engage in the communication session with the first set-top box, wherein one of the one or more receiving set-top boxes includes the second set-top box.

6. The method of claim 1, wherein receiving the selection of the communication application for initiating the communication session further comprises receiving the selection of one of the one or more receiving set-top boxes, wherein the selected one of the one or more receiving set-top boxes is the second set-top box.

7. The method of claim 1, wherein after sending the communication session invitation from the first set-top box to the second set-top box, at the second set-top box launching an incoming communication alert on a display monitor associated with the second set-top box.

8. The method of claim 7, wherein launching the incoming communication alert includes displaying the incoming communication alert in a user interface component displayed on the display monitor associated with the second set-top box.

9. The method of claim 8, further comprising, at the second set-top box, accepting the communication session invitation received from the first set-top box.

10. The method of claim 1, wherein the first and second set-top boxes are part of a set of two or more set-top boxes deployed in a facility, wherein each of the two or more deployed set-top boxes are connected to one another via a primary set-top box.

11. The method of claim 10, wherein the primary set-top box is established as a proxy server for managing communication sessions between set-top boxes included in the set of two or more set-top boxes deployed in the facility.

12. The method of claim 11, further comprising establishing each of the remaining of the two or more set-top boxes as client communication devices operative to communicate with other of the two or more set-top boxes at the direction of the proxy server.

13. The method of claim 1, wherein the first set-top box is part of the network of set-top boxes contained in a first facility, and wherein the second set-top box is part of a network of set-top boxes contained in a second facility, and wherein allowing the communication session between the first and second set-top boxes includes transporting communication data from the first set-top box in the first facility to the second set-top box in the second facility via a cable services system operative to link data between the first and second facilities.

14. The method of claim 1, wherein allowing the communication session between the first and second set-top boxes, includes allowing a text chat session between the first and second set-top boxes.

15. The method of claim 1, wherein allowing the communication session between the first and second set-top boxes, includes allowing a voice chat session between the first and second set-top boxes.

16. The method of claim 1, wherein allowing the communication session between the first and second set-top boxes, includes allowing a video session between the first and second set-top boxes.

17. The method of claim 1, wherein allowing the communication session between the first and second set-top boxes, includes allowing the management of operating controls of the second set-top box from the first set-top box.

18. The method of claim 1, wherein allowing the communication session between the first and second set-top boxes, includes allowing a gaming session between the first and second set-top boxes.

19. A computer-readable medium containing computer executable instructions which when executed by a computer perform a method of communication between networked cable services devices, comprising:
connecting a first set-top box to a second set-top box for allowing data to pass between the first and second set-top boxes;
establishing a digital communications protocol between the first and second set-top boxes for allowing digital communications to pass between the first and second set-top boxes;
at the first set-top box, initiating a communication session between the first and second set-top boxes;
providing one or more communication applications that may be executed for initiating the communication session between the first and second set-top boxes;
receiving a selection of a communication application for initiating the communication session between the first and second set-top boxes;
sending a communication session invitation from the first set-top box to the second set-top box; and
at the second set-top box, allowing the communication session between the first and second set-top boxes.

20. A method of communication between networked cable services devices, comprising:
connecting a first set-top box to a second set-top box for allowing data to pass between the first and second set-top boxes;
establishing a digital communications protocol between the first and second set-top boxes for allowing digital communications to pass between the first and second set-top boxes;
at the first set-top box, initiating a communication session between the first and second set-top boxes;
providing one or more communication applications that may be executed for initiating the communication session between the first and second set-top boxes;
receiving a selection of a communication application for initiating the communication session between the first and second set-top boxes;

sending a communication session invitation from the first set-top box to the second set-top box;

at the second set-top box, allowing the communication session between the first and second set-top boxes; and wherein the first set-top box is part of a network of set-top boxes contained in a first facility, and wherein the second set-top box is part of the network of set-top boxes contained in a second facility, and wherein allowing the communication session between the first and second set-top boxes includes transporting communication data from the first set-top box in the first facility to the second set-top box in the second facility via a cable services system operative to link data between the first and second facilities.

* * * * *

UNITED STATES PATENT AND TRADEMARK OFFICE
CERTIFICATE OF CORRECTION

| | | |
|---|---|---|
| PATENT NO. | : 8,392,943 B2 | Page 1 of 1 |
| APPLICATION NO. | : 12/698530 | |
| DATED | : March 5, 2013 | |
| INVENTOR(S) | : Raza et al. | |

It is certified that error appears in the above-identified patent and that said Letters Patent is hereby corrected as shown below:

In the Claims:

Col. 14, line 1, claim 13: "part of a network of" should read --part of the network of--

Signed and Sealed this
Twenty-fifth Day of March, 2014

Michelle K. Lee
*Deputy Director of the United States Patent and Trademark Office*